(12) United States Patent
Castro et al.

(10) Patent No.: US 7,644,207 B2
(45) Date of Patent: Jan. 5, 2010

(54) HIGH SPEED BUS FOR ISOLATED DATA ACQUISITION APPLICATIONS

(75) Inventors: Rafael Castro, Round Rock, TX (US); Haider A. Khan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 188 days.

(21) Appl. No.: 11/770,807

(22) Filed: Jun. 29, 2007

(65) Prior Publication Data

US 2008/0046627 A1 Feb. 21, 2008

Related U.S. Application Data

(60) Provisional application No. 60/823,031, filed on Aug. 21, 2006.

(51) Int. Cl.
*G06F 3/00* (2006.01)
*G06F 5/00* (2006.01)
*G06F 13/12* (2006.01)
*G06F 13/38* (2006.01)

(52) U.S. Cl. .............................. 710/60; 710/40; 710/62; 710/69

(58) Field of Classification Search .................... 710/62, 710/40, 60
See application file for complete search history.

(56) References Cited

U.S. PATENT DOCUMENTS

| | | | |
|---|---|---|---|
| 4,901,275 A * | 2/1990 | Hardie et al. .................. | 710/69 |
| 4,907,597 A * | 3/1990 | Chamoun ..................... | 600/544 |
| 4,929,939 A * | 5/1990 | Varma et al. ................ | 340/2.24 |
| 4,991,217 A | 2/1991 | Garrett et al. | |
| 5,274,795 A | 12/1993 | Vachon | |
| 5,648,918 A * | 7/1997 | Hubbard ..................... | 702/107 |
| 5,686,917 A * | 11/1997 | Odom et al. ................. | 341/141 |
| 5,797,040 A | 8/1998 | Nakamura | |

(Continued)

OTHER PUBLICATIONS

Calvet, Denis; "A Review of Technologies for the Transport of Digital Data in Recent Physics Experiments"; 14th IEEE-NPSS Real Time Conference; Stockholm, Sweden; Jun. 4-10, 2005; 5 pages.

(Continued)

*Primary Examiner*—Niketa Patel
*Assistant Examiner*—Farley J Abad
(74) *Attorney, Agent, or Firm*—Meyertons Hood Kivlin Kowert & Goetzel P.C.; Jeffrey C. Hood

(57) ABSTRACT

An isolated data acquisition device including a plurality of data acquisition channels, an isolated system management unit coupled to the data acquisition channels, a host system management unit, a serial bus coupled to the host system management unit and the isolated system management unit, and isolation circuitry coupled to the serial bus. The isolation circuitry electrically isolates the host system management unit from the isolated system management unit and the data acquisition channels. During operation, the isolated system management unit and the host system management unit may each store data associated with one or more pending bus transactions. Each of the system management units may select at least one of the pending bus transactions according to a predetermined priority scheme, encode and serialize the data associated with the selected bus transaction, and transmit the serialized data across the isolation circuitry to the other system management unit via the serial bus.

20 Claims, 10 Drawing Sheets

U.S. PATENT DOCUMENTS

| | | |
|---|---|---|
| 6,088,750 A | 7/2000 | Beaman et al. |
| 6,266,716 B1 | 7/2001 | Wilson et al. |
| 6,430,710 B1 | 8/2002 | Moriyama et al. |
| 6,876,994 B2 * | 4/2005 | Ishikawa et al. ............... 707/1 |
| 6,937,957 B2 | 8/2005 | Viard et al. |
| 7,072,803 B2 | 7/2006 | Viard et al. |
| 7,468,602 B2 * | 12/2008 | Sleeman et al. ........... 324/99 D |
| 2004/0184404 A1 * | 9/2004 | Carpenter et al. ........... 370/235 |

OTHER PUBLICATIONS

Park, et al.; "High-Speed Real-Time Data Acquisition for Vector Measuring Current Meters"; IEEE Journal of Oceanic Engineering, vol. 16, No. 4; Oct. 1991; 8 pages.

Toledo, et al.; "A Plug and Play Approach to Data Acquisition"; IEEE Transactions on Nuclear Science, vol. 49, No. 3; Jun. 2002; 5 pages.

Dawson, D.M.; "Architecture for a next generation telemetry and data acquisition bus"; Proceedings of the International Telemetering Conference; Las Vegas, Nevada; Nov. 4-7, 1991; pp. 725-729.

* cited by examiner

US 7,644,207 B2

HIGH SPEED BUS FOR ISOLATED DATA ACQUISITION APPLICATIONS

PRIORITY CLAIM

This application claims benefit of priority of U.S. provisional patent application No. 60/823,031 titled "High Speed Bus for Isolated Data Acquisition Applications" filed on Aug. 21, 2006 whose inventors were Rafael Castro and Haider A. Khan, and which is hereby incorporated by reference as though fully and completely set forth herein.

BACKGROUND OF THE INVENTION

1. Field of the Invention

This invention relates to measurement and data acquisition systems and, more particularly, to isolated data acquisition applications.

2. Description of the Related Art

In isolated data acquisition (DAQ) applications, DAQ boards typically need to provide a high level of I/O connections which perform some kind of measurement and are electrically isolated from the host bus. In other words, a bank of measurement devices or subsystems may be isolated from a computer bus, such as USB or PCI. Each subsystem may operate asynchronously with respect to the other subsystems. Also, each subsystem may need to keep constant communication with the host system either to receive or generate data, as well as to generate status or events of interest to the user.

In typical DAQ systems, these requirements may be met by isolating the measurements at the I/O. However, there are several drawbacks to isolating the measurements at or near the I/O. First, since DAQ boards typically have numerous I/O lines, isolating the measurements at or near the I/O typically requires a large number of isolator devices. This increases the cost of the DAQ board, increases the power consumption, and reduces the area in the board that is available for circuit implementation. Second, an isolated DAQ has lower performance compared to a non-isolated device, because low-cost isolators are usually slow and fast isolators typically introduce skew and jitter between the lines being isolated. Lastly, from a practical sense, it is usually discouraged to interface high-resolution data converters with a parallel interface.

Many other problems and disadvantages of the prior art will become apparent to one skilled in the art after comparing such prior art with the present invention as described herein.

SUMMARY OF THE INVENTION

Various embodiments are disclosed of an isolated data acquisition device. In one embodiment, the isolated data acquisition device includes a plurality of data acquisition channels, a plurality of data processing subsystems coupled to the data acquisition channels, an isolated system management unit coupled to the data processing subsystems via the data acquisition channels, a host system management unit coupled to a host communication channel, a serial bus coupled to the host system management unit and the isolated system management unit, and isolation circuitry coupled to the serial bus. The isolation circuitry is configured to electrically isolate the host system management unit from the isolated system management unit and the data processing subsystems.

During operation, the isolated system management unit and the host system management unit may each store data associated with one or more pending bus transactions. Each of the system management units may select at least one of the pending bus transactions according to a predetermined priority scheme, encode and serialize the data associated with the selected bus transaction, and transmit the serialized data across the isolation circuitry to the other system management unit via the serial bus.

The data processing subsystems may be one or more of the following: analog input subsystems, analog output subsystems, digital input subsystems, and digital output subsystems. The pending bus transactions may be one or more of the following: data streaming transactions, memory I/O transactions, and interrupt transactions. In one embodiment, the serial bus may include a plurality of transmission lines, and the isolation circuitry may include a corresponding plurality of isolation devices. The isolation devices may be connected to corresponding transmission lines to isolate the host system management unit from the isolated system management unit and the data processing subsystems.

Figure 1:
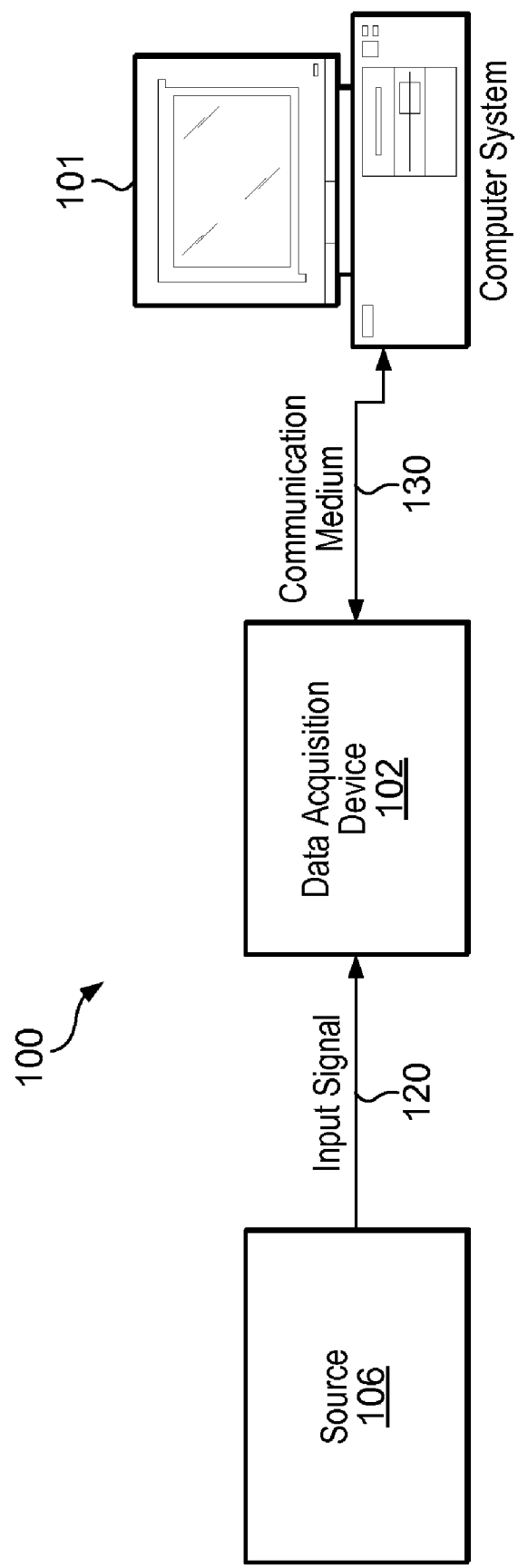
FIG. 1 is a diagram of one embodiment of a computer-based measurement system or data acquisition system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

FIG. 1 is a diagram of one embodiment of a computer-based measurement system or data acquisition system 100. The data acquisition system 100 may comprise a computer system 101, a measurement device referred to as a data acquisition (DAQ) device 102, and source device 106. As illustrated in FIG. 1, in one embodiment, the computer system 101 may be coupled to the DAQ device 102 via a communication medium 130. The DAQ device 102 may be an internal card or board coupled to a bus, e.g., a Peripheral Component Interconnect (PCI™), PCI EXPRESS®, Industry Standard Architecture (ISA), or Extended Industry Standard Architecture (EISA) bus, but is shown external to the computer 101 for illustrative purposes. The measurement device or DAQ device 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

The DAQ device 102 may be coupled to an external source 106, such as an instrument, sensor, transducer, or actuator from which the DAQ device 102 may receive an input signal 120, e.g., an analog input such as sensor data. In one example, the external source 106 may be a temperature sensor included in a unit under test (UUT). In this example, the DAQ device 102 may receive temperature reading from the temperature sensor and convert the analog data to digital form to be sent to the computer system 101 for analysis. Additionally, the DAQ device 102 may receive a digital input, e.g., a binary pattern, from the external source 106. Furthermore, the DAQ device 102 may also produce analog or digital signals, e.g., for stimulating the UUT. It is noted, however, that in some embodiments, the DAQ device 102 may be connected to source device 106 (e.g., a sensor or other component) that is internal to the computer system 101 and/or the DAQ device 102.

The computer system 101 may control the operations of the DAQ device 102. For example, the computer system 101 may direct the DAQ device 102 to perform an acquisition, and may obtain data from the DAQ device 102 for storage and analysis therein. Additionally, the computer system 101 may send data to the device 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program the DAQ device 102 accordingly.

Figure 2:
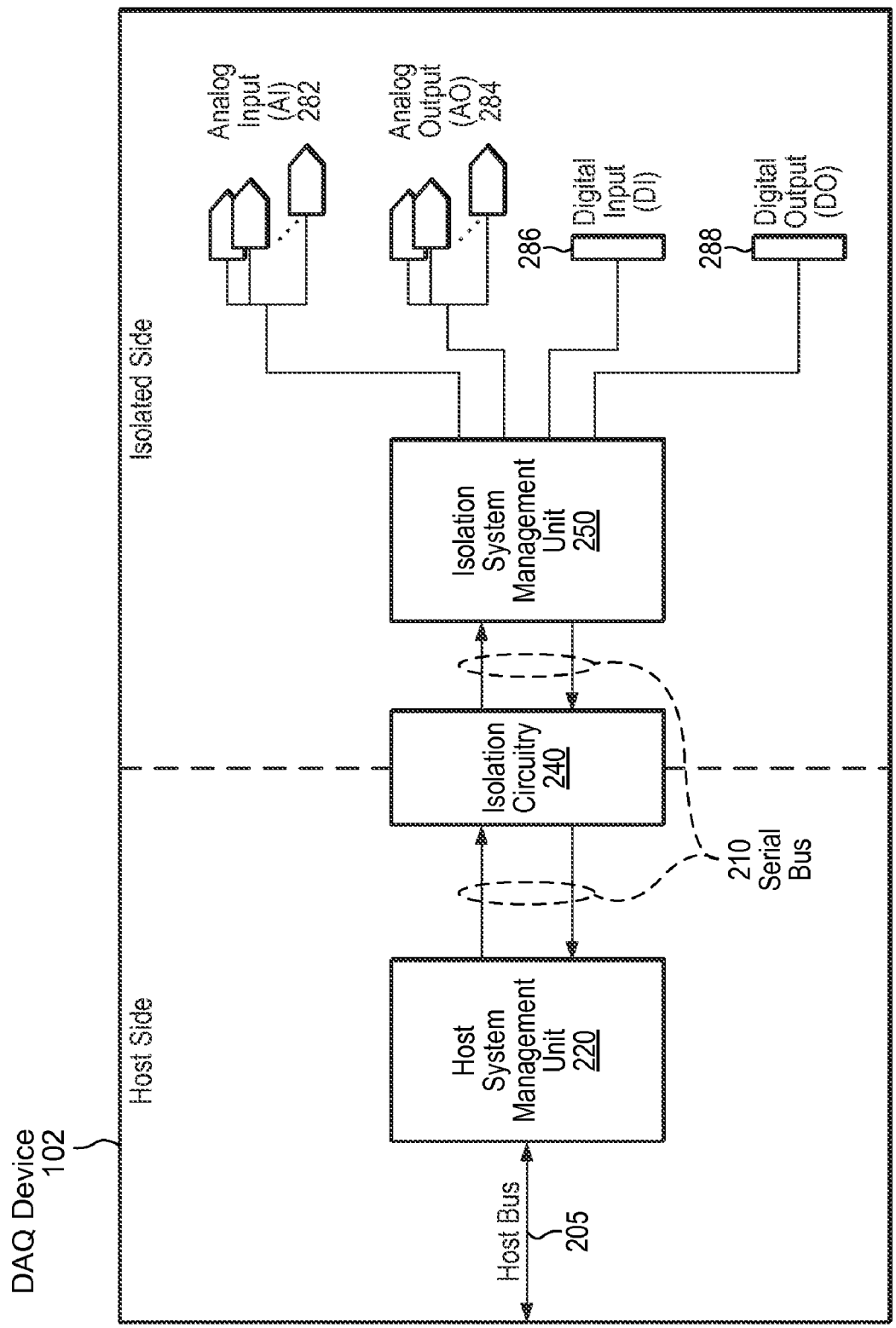
FIG. 2 is a block diagram of one embodiment of an isolated data acquisition (DAQ) device including a host system management unit and an isolated system management unit.

FIG. 2 is a block diagram of one embodiment of an isolated data acquisition (DAQ) device 102. As described above, the isolated DAQ device 102 may be an internal device coupled to, e.g., a PCI bus, or may also be an external device coupled to the computer system 101 via a serial bus, e.g., MXI bus, or a parallel bus, e.g., a GPIB. The DAQ device 102 may be a board or a module comprising one or more integrated circuits (ICs) or the DAQ device 102 may be an IC, for example, a mixed-signal IC.

The isolated DAQ device 102 may comprise a host bus 205, a host system management unit 220, a serial bus 210, isolation circuitry 240, an isolation system management unit 250, an analog input (AI) subsystem 282, an analog output (AO) subsystem 284, a digital input (DI) subsystem 286, and a digital output (DO) subsystem 288. As illustrated, DAQ device 102 may include a host side section that is electrically isolated from an isolated side section by isolation circuitry 240. The host side section may include host system management unit 220, which is connected to host bus 205 and serial bus 210. The isolated side section may include isolated system management unit 250, which is connected to serial bus 210, and analog/digital I/O subsystems 282, 284, 286, and 288.

The DAQ device 102 may receive and send digital and/or analog data via input and output (I/O) lines connected to the analog I/O subsystems 282 and 284, and the digital I/O subsystems 286 and 288. For example, the I/O lines may be connected to a signal source (e.g., source 106 of FIG. 1) included in a WUT to receive digital and/or analog signals. Also, DAQ device 102 may receive data from the host bus 205, which may be connected to a host computer system (e.g., computer system 101 of FIG. 1).

It should be noted that the components described with reference to FIG. 2 are meant to be exemplary only, and are not intended to limit the invention to any specific set of components or configurations. For example, in various embodiments, one or more of the components described may be omitted, combined, modified, or additional components included, as desired. For instance, in one embodiment, DAQ device 102 may include the digital I/O subsystems 286 and 288, but not the analog I/O subsystems 282 and 284.

In various embodiments, DAQ device 102 may include multiple independent high-speed subsystems, such as AI subsystem 282 and DO subsystem 288, which may operate simultaneously behind isolation circuitry 240. Serial bus 210 may be a high-speed bus that supports high-speed data pipes or "streams", as will be further described below with reference to FIGS. 4A-4B. These data streams may be used to provide data to the subsystems, as well as collect data from the subsystems. Each data stream may start and stop without affecting the other subsystems or streams. DAQ device 102 may include mechanisms for data flow control to help prevent data loss due to latencies in the system. Serial bus 210 may support "programmed memory I/O" or host initiated communications (see FIGS. 5A-5B), which are typically used for configuration of the isolated subsystems, or for slower applications that do not require the high-speed streams. Furthermore, serial bus 210 may support an interrupt mechanism by which the isolated subsystems can send notifications of events to the host system 101, as will be further described with reference to FIGS. 6A-6B.

This isolated data acquisition design with isolation circuitry 240 and serial bus 210 may require a minimum number of isolators compared to the typically I/O isolation techniques. For instance, in one specific implementation, if serial bus 210 includes 3-5 transmission lines in one direction and 3-5 transmission lines in the other direction, only 6-10 total isolators may be needed to achieve isolation, for example. Limiting the number of isolators may significantly reduce cost and real estate in the system boards. Also, this isolation technique may substantially improve system performance. Limitations and problems typically introduced with digital isolators may be hidden by the inclusion of serial bus 210 and corresponding circuitry. In other words, the actual measurements obtained with this solution may behave as if it was a non-isolated device. Furthermore, the power consumption of this solution may be lower than typical I/O isolation solutions. For instance, power consumption in DAQ device 102 may be controlled by slowing down serial bus 210. Also, serial bus 210 is designed to maximize bandwidth while minimizing the frequency of operation, which usually simplifies the design of the isolated DAQ device 102 and minimizes the power consumption.

Figure 3:
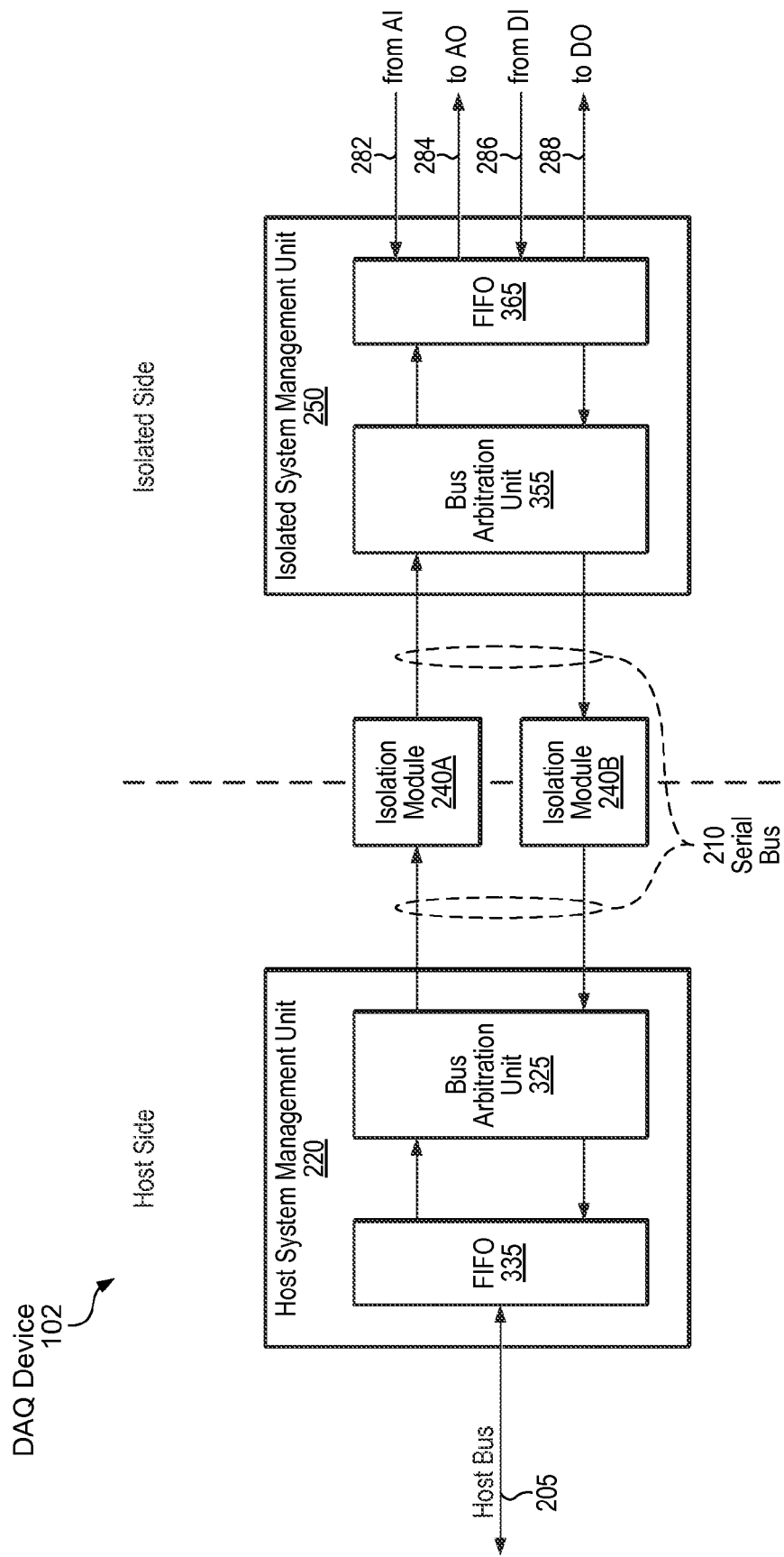
FIG. 3 is a block diagram of one embodiment of the host system management unit and isolated system management unit.

In some embodiments, as illustrated in FIG. 3, host system management unit 220 may include bus arbitration unit 325 and FIFO buffer 335, and isolated system management unit 250 may include bus arbitration unit 355 and FIFO buffer 365. FIFO buffers 335 and 365 may store data associated with one or more pending bus transactions. The bus transactions may be initiated by host system 101 (via host bus 205) and/or by the isolated subsystems, e.g., AI 282 and DI 286. Bus arbitration units 325 and 355 may select at least one of the pending bus transactions, e.g., according to a priority based selection scheme, and then begin to execute the selected bus transaction(s). Bus arbitration units 325 and 355 may also encode and serialize data for transmission via serial bus 210, and/or decode and deserialize data that is received via serial bus 210 (see also FIGS. 4A-6B). As shown in FIG. 3, in one embodiment, isolation circuitry 240 may comprise one isolation module 240A for one channel and another isolation module 240B for the other channel. In one specific implementation, each isolation module may be an integrated circuit (IC) including two or more isolation devices (e.g., high-speed digital isolators). It is noted that in other embodiments one or more of the components described may be omitted, combined, modified, or additional components included, as desired. For instance, in one embodiment, the system management units 220 and 250 may include other types of memory devices instead of or in addition to the FIFO buffers 335 and 365. Also, in other embodiments, isolation circuitry 240 may comprise a single isolation module including a plurality of isolation device for each of the channels.

As described above, serial bus 210 may include one channel including a plurality of transmission lines for sending data from host system management unit 220 to isolated system management unit 250, and another channel including a plurality of transmission lines for sending data from isolated system management unit 250 to host system management unit 220. In various embodiments, both channels may implement double data rate (DDR) transmissions, in order to send data through the channels. In these embodiments, communications may be in packet form and may be framed by a header word (e.g., H0), which indicates the type of packet that is being sent. In one specific implementation, the protocol may require that the header H0 be placed on the serial bus 210 on the falling edge of the clock, so that the target can receive the header H0 on the rising edge of the clock. This implementation may allow a two-word header (e.g., H1 after H0) and may be able to process the complete header on the next rising edge of the clock. This technique may implement a packet-based serial protocol for data movement on every clock edge. Furthermore, this technique may prevent the need to use a DLL to generate a clock that is twice as fast as the serial clock, and may allow the design to run the channels at lower frequencies and thus save power.

Figure 4A:
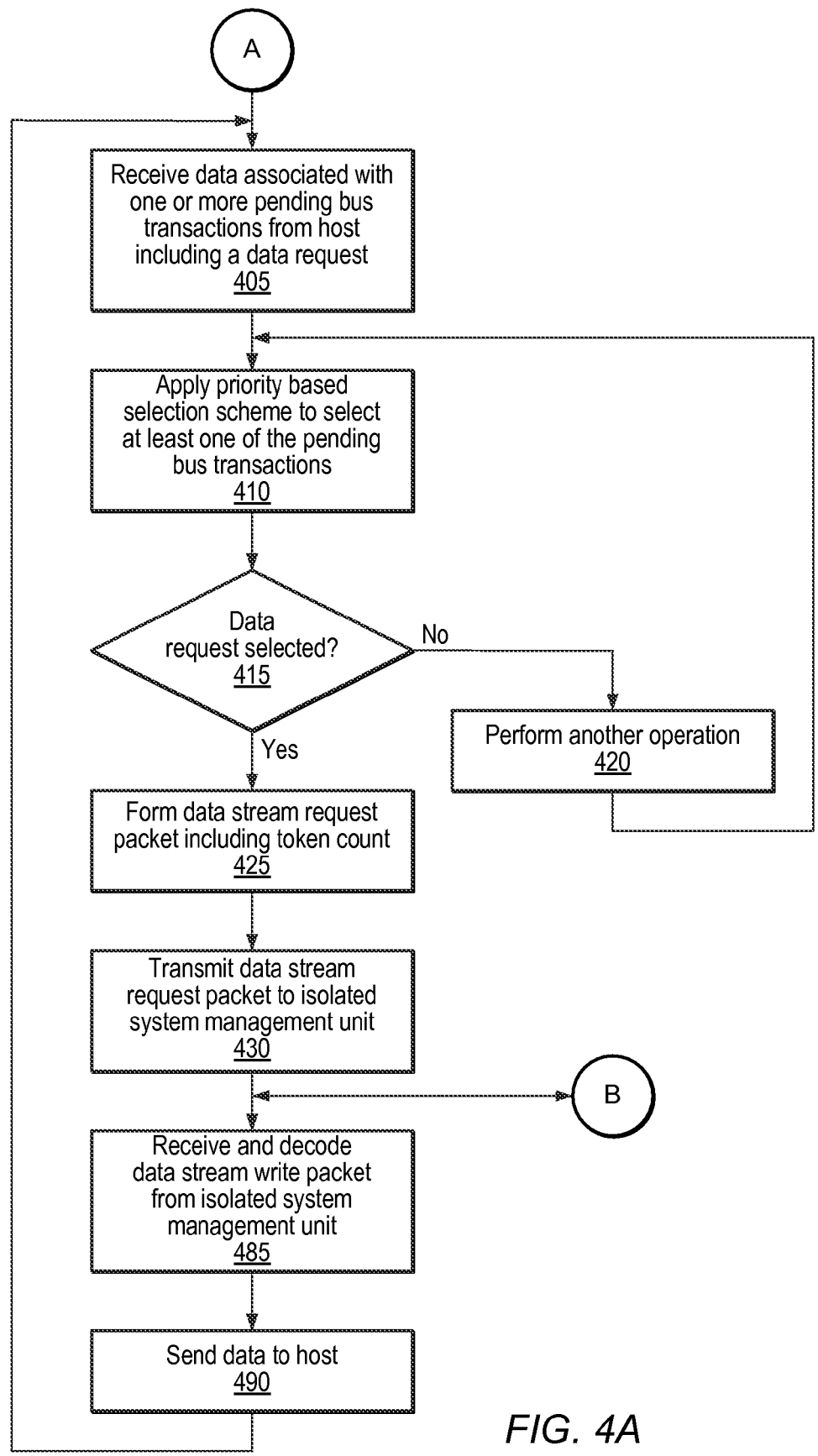
FIG. 4A is a flow diagram illustrating a method for selecting and performing a data stream bus transaction using the host system management unit of the isolated DAQ device, according to one embodiment.
Figure 4B:
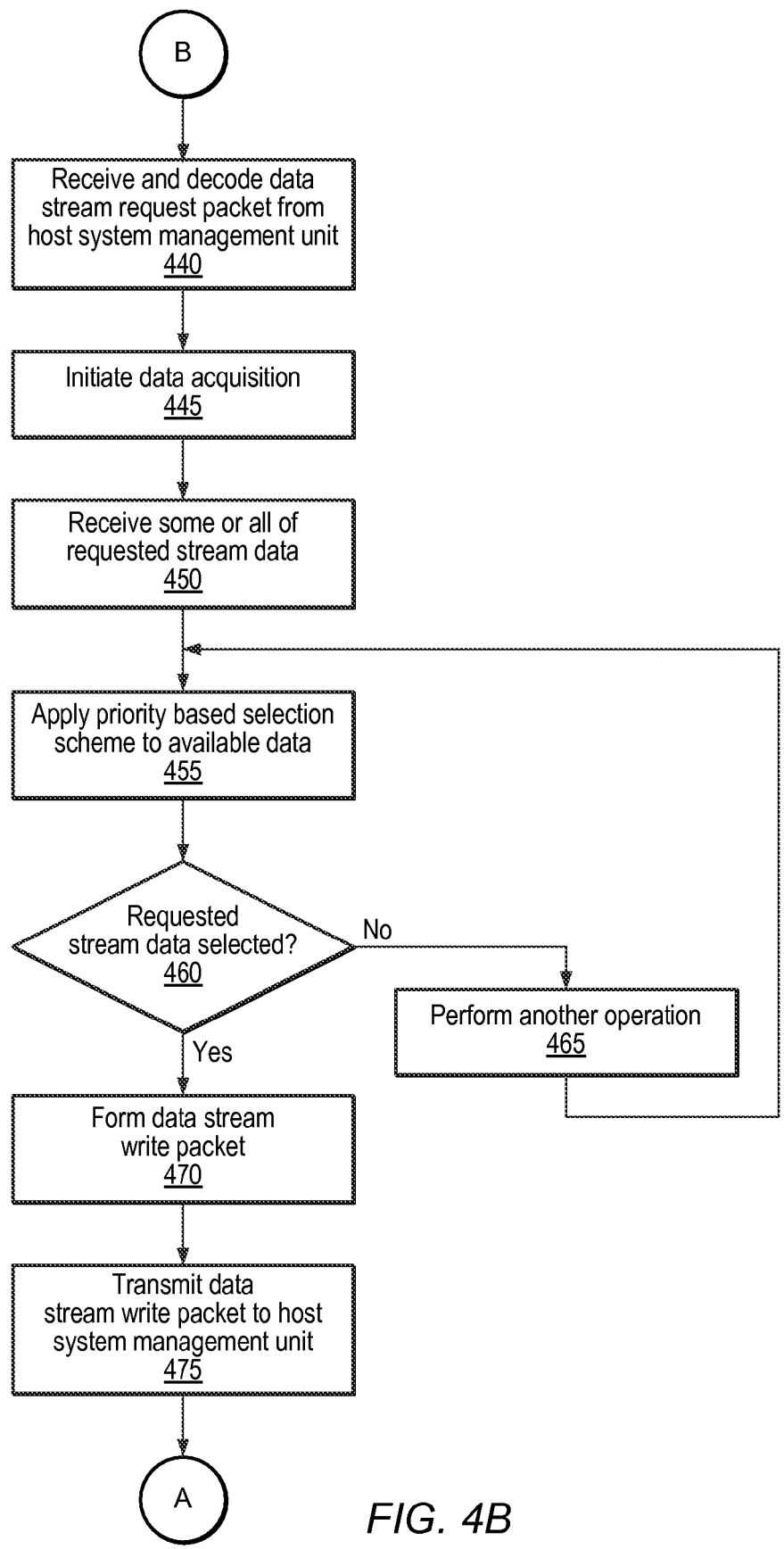
FIG. 4B is a flow diagram illustrating a method for selecting and performing a data stream bus transaction using the isolated system management unit of the isolated DAQ device, according to one embodiment.

FIGS. 4A and 4B are flow diagrams illustrating a method for selecting and performing a data stream bus transaction in the isolated DAQ device 102, according to one embodiment. It should be noted that in various embodiments, some of the steps shown may be performed concurrently, in a different order than shown, or omitted. Additional steps may also be performed as desired.

Data stream transactions over serial bus 210 may involve high-speed data transfers between the host side section and the isolated side section of DAQ device 102. For example, a data stream transaction initiated by the host may cause one of the subsystems (e.g., AI subsystem 282) in the isolated section to acquire sensor data from a source (e.g., source 106) and send the acquired data to the host side via serial bus 210. Furthermore, each data stream transaction may be independent of the other pending data stream transactions, and two separate subsystems may perform different data stream transactions at the same time.

Data stream transactions work the same way in both directions, whether they are initiated by host system management unit 220 or isolated system management unit 250. A data stream transaction may be either a data stream request transaction or a data stream write transaction. In a data stream request transaction, the requesting management unit (e.g., unit 220) may send a data stream request packet to the transmitting management unit (e.g., unit 250). In one specific implementation, the data stream request packet may include a token count, which may represent the basic flow control tool on the data stream request that indicates how much data the transmitting management unit should send to the requesting management unit to satisfy the data stream request. After acquiring some or all of the requested data, the transmitting management unit may initiate a data stream write transaction. In a data stream write transaction, the transmitting management unit (e.g., unit 250) may send a data stream write packet including some or all of the requested data to the requesting management unit (e.g., unit 220).

Referring collectively to FIG. 2-4B, during operation, host system management unit 220 may receive and store data associated with one or more pending bus transactions, e.g., data associated with data request transactions from host 101 (block 405). In one embodiment, the data may be stored in FIFO buffer 335 shown in FIG. 3. Host system management unit 220 may also receive and store data associated with various other types of bus transactions, e.g., memory I/O transactions or interrupt requests.

Host system management unit 220 may apply a priority based selection scheme to select at least one of the pending bus transactions for execution (block 410). The priority based selection scheme may assign higher priorities to certain types of transaction compared to other types of transactions. In one specific implementation, the priority based selection scheme may assign a higher priority to programmed memory I/O transactions (i.e., memory reads and writes) than to data stream transactions, and interrupt transactions may be assigned higher priority than both memory I/O and data stream transactions. It is noted, however, that other priority based schemes may be implemented, for example, in other implementations data stream transactions may be assigned higher priority than the memory I/O transactions.

If host system management unit 220 selects the host-initiated data stream transaction (block 415), host system management unit 220 may form a data stream request packet, including a token count, e.g., based on the available space for data associated with the selected bus transaction (block 425). If host system management unit 220 does not select the data stream transaction (block 415), host system management unit 220 may begin performing another operation(s), e.g., a memory I/O (block 420), before once again checking the priority of the pending bus transactions (block 410).

Host system management unit 220 may form the data stream request packet by encoding and serializing the data associated with the selected data request transaction. In one embodiment, bus arbitration unit 325 of host system management unit 220 may include an encoder and a serializer to perform these functions. In one specific implementation, the data stream request packet may include a first header H0, a second header H1, a stream ID, and a token count. The first header H0 may indicate the type of transaction (e.g., a data stream transaction), and the second header H1 may indicate a description of the specific operation (e.g., a data stream request or data stream write). The stream ID may be a tool for keeping track of the different streams that are being performed at any given time. In a data stream transaction, when the transmitting management unit sends some or all of the requested data to the requesting management unit, the data packet will include the same stream ID that was originally sent in the data stream request packet. This allows the requesting management unit (and other system components) to track how much of a specific data stream request has been satisfied.

As describe above, the token count may indicate how much data the transmitting management unit is authorized to send to the requesting management unit. For instance, each token may represent a data packet of the default stream size, e.g., 32 bits. In one embodiment, the stream size may be programmable to customize the amount of data each token represents. Since the transmitting management unit may not send data to the requesting management unit unless it receives a token count authorizing it to do so, the token based flow control mechanism may help avoid overflow and underflow error conditions from occurring on either side of the isolation barrier.

After forming the data stream request packet, host system management unit 220 may transmit the packet across the isolation barrier to isolated system management unit 250 via serial bus 210 for processing (block 430).

As illustrated in FIG. 4B, isolated system management unit 250 may receive and decode the data stream request packet (block 440). After determining that it is a data stream request packet (e.g., from the headers H0 and H1), isolated system management unit 250 may initiate a data acquisition operation for the requested data (block 445). After receiving some or all of the requested stream data (block 450), isolated system management unit 250 may apply the priority based selection scheme to the pending bus transactions (block 455). If the requested stream data is selected (460), isolated system management unit 250 may form a data stream write packet including an amount of data corresponding to some or all of the received token count (block 470). If the requested stream data is not selected (460), isolated system management unit 250 may begin performing another operation(s), e.g., a memory read response (block 465), before once again checking the priority of the pending transactions (block 455).

Similar to data stream request packets, each data stream write packet includes a first header H0, a second header H1, and a stream ID. The data stream request packet further includes some or all of the requested data. For example, the packet may include 8, 16, or 32 bits of data payload. It is noted, however, that the data payload may be programmable to customize the amount of data that is transferred in each packet.

After forming the packet, isolated system management unit 250 may transmit the data stream write packet to host management unit 220 via serial bus 210 (block 475). Isolated system management unit 250 may need to send various data stream write packets to satisfy the data stream request. For example, if the data stream request packet included a token count of 15, and transmitting management unit initially sends a data stream write packet including 7 tokens worth of data, the transmitting management unit will need to send at least one additional data stream write packet with 8 tokens worth of data to satisfy the request.

Returning to FIG. 4A, host system management unit 220 may receive and decode the data stream write packet from isolated system management unit 250 (block 485) and may then provide the data to host bus 205 for transmission to host system 101 (block 490).

In one embodiment, host system management unit 220 may send additional data stream request packets, including additional tokens, as it receives some of the requested data in write packets from isolated system management unit 250. For instance, if host system management unit 220 sent 25 tokens in the original data stream request, after receiving 8 tokens worth of data from isolated system management unit 250 (e.g., via one or two data stream write packets), host system management unit 220 may send an additional data stream request packet including 8 additional tokens (i.e., token count of 8). In one specific implementation, host system management unit 220 may send additional data stream request packets, including additional tokens, if it has enough space, e.g., in FIFO buffer 335, that is designated for data stream transactions to store additional stream data. In other words, in this specific implementation, the space available within FIFO buffer 335 (or an equivalent memory) may determine whether host system management unit 220 sends additional tokens to isolate system management unit 250. A similar flow control method may be employ with respect to FIFO 365 and isolated system management unit 250. It is noted, however, that many variations of the data stream process may be adopted to satisfy data stream requirements in the system.

It is noted, however, that in other embodiments the isolated DAQ device 102 described above may process data stream requests by other methods, e.g., the data stream information may be organized and stored by other mechanisms and/or the priority selection scheme for selecting available data may vary.

Figure 5A:
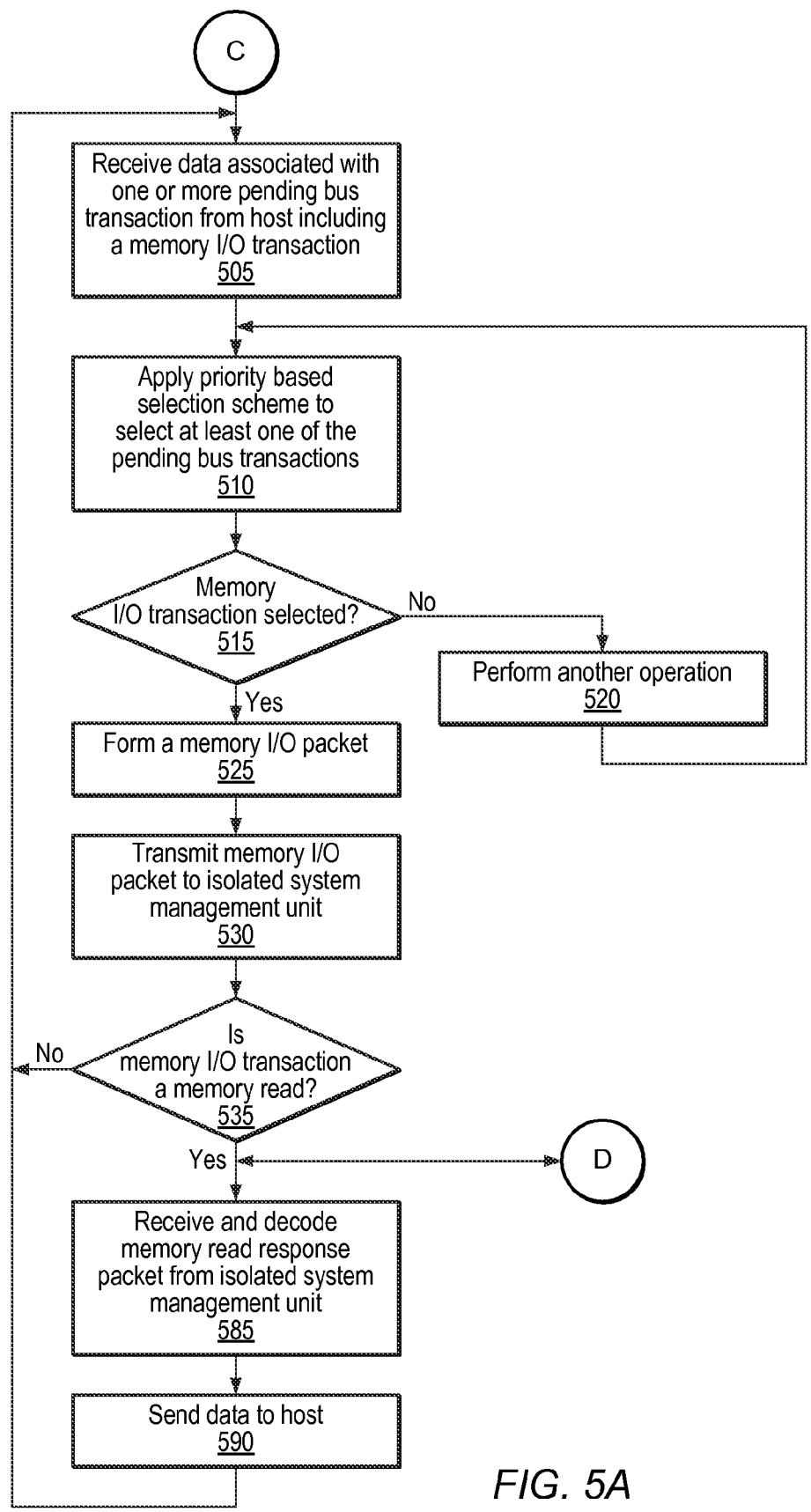
FIG. 5A is a flow diagram illustrating a method for selecting and performing a memory I/O bus transaction using the host system management unit of the isolated DAQ device, according to one embodiment.
Figure 5B:
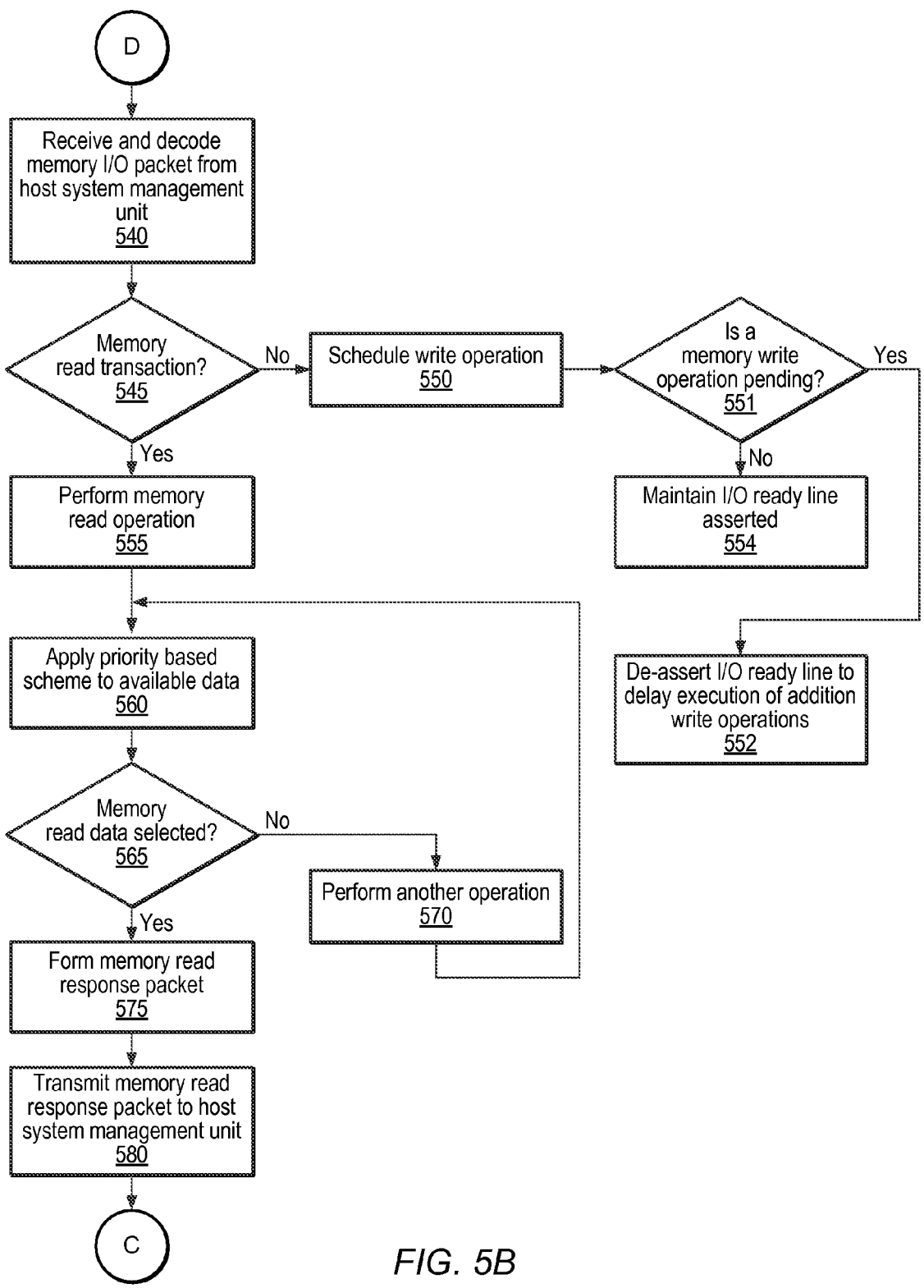
FIG. 5B is a flow diagram illustrating a method for selecting and performing a memory I/O bus transaction using the isolated system management unit of the isolated DAQ device, according to one embodiment.

FIGS. 5A and 5B are flow diagrams illustrating a method for selecting and performing a memory I/O bus transaction in the isolated DAQ device 102, according to one embodiment. It should be noted that in various embodiments, some of the steps shown may be performed concurrently, in a different order than shown, or omitted. Additional steps may also be performed as desired.

Memory I/O transactions, which originate in the host section of DAQ device 102, may either be a memory read transaction or a memory write transaction. Essentially, memory I/O transactions perform a read or a write operation to a designated address in the isolated section of DAQ device 102, or to an address of a device that is connected to the isolated section.

In memory read transactions, the requesting management unit (e.g., unit 220) may send a memory read packet to the transmitting management unit (e.g., unit 250). In one specific implementation, the memory read packet may include two headers (H0 and H1) and an address. The first header H0 may specify the type of transaction (e.g., memory read) and the second header H1 may specify the corresponding size of the read (e.g., 8, 16, or 32 bits). In a memory write transaction, the transmitting management unit may send a memory write packet to the requesting management unit. The memory write packet may include two headers, an address, and a payload of data. The first header H0 may specify the type of transaction (e.g., memory write) and the second header may specify the corresponding size of the write (e.g., 8, 16, or 32 bits). The payload of data includes the actual data that will be written to the corresponding address on the other side of the isolation barrier.

Referring collectively to FIGS. 2-3 and 5A-5B, during operation, host system management unit 220 may receive and store data associated with one or more pending bus transactions, e.g., data associated with memory I/O transactions from host 101 (block 505). In one embodiment, the data may be stored in FIFO buffer 335 shown in FIG. 3. Host system management unit 220 may also receive and store data associated with various other types of bus transactions, e.g., data stream requests or interrupt requests.

Host system management unit 220 may apply a priority based selection scheme to select at least one of the pending bus transactions for execution (block 510). The priority based selection scheme may be similar to the scheme described above with reference to FIG. 4A.

If host system management unit 220 selects the memory I/O transaction (block 515), host system management unit 220 may form a memory I/O packet (e.g., memory read packet) based on the stored data associated with the selected bus transaction (block 525). If host system management unit 220 does not select the memory I/O transaction (block 515), host system management unit 220 may begin performing another operation(s), e.g., a data stream request (block 520), before once again checking the priority of the pending transactions (block 510).

Host system management unit 220 may form the memory I/O packet by encoding and serializing the data associated with the selected memory I/O transaction. As described above, in one embodiment, bus arbitration unit 325 of host system management unit 220 may include an encoder and a serializer to perform these functions. In one specific implementation, the data may include an address associated with the memory read or write. Host system management unit 220 may encode this address information to form the memory I/O packet.

After forming the memory I/O packet, host system management unit 220 may transmit the packet across the isolation barrier to isolated system management unit 250 via serial bus 210 for processing (block 530).

As illustrated in FIG. 5B, isolated system management unit 250 may receive and decode the memory I/O packet (block 540). Isolated system management unit 250 may then determine (e.g., from the header H0) whether the memory I/O packet is associated with a memory read transaction (block 545). If the packet is a memory read packet, isolated system management unit 250 may perform a memory read operation (block 555). In a memory read operation, isolated system management unit 250 may initiate a process for fetching data stored in the location specified by the address of the memory read packet.

After performing the memory read operation (block 555), isolated system management unit 250 may apply the priority based selection scheme to the pending bus transactions (block 560). If the memory read data is selected (565), isolated system management unit 250 may form a memory read response packet (block 575). Isolated system management unit 250 may then transmit the memory read response packet to host management unit 220 (block 580). In one specific implementation, the memory read response packet may include two headers and the data payload corresponding to the memory read operation. In another implementation, the memory read response packet (and also the memory read request) may additionally include a memory read ID, in order to track the various memory read transactions that are being executed. If the memory read data is not selected (565), isolated system management unit 250 may begin performing another operation(s), e.g., a data stream write operation (block 570), before once again checking the priority of the pending transactions (block 560).

Returning to FIG. 5A, host system management unit 220 may receive and decode the memory read response packet from isolated system management unit 250 (block 585) and may then provide the data to host bus 205 for transmission to host system 101 (block 590).

If the received memory I/O is a memory write packet, the isolated system management unit 250 may schedule the memory write operation (block 550). In one specific implementation, isolated system management unit 250 may determine whether the scheduled write operation is currently pending execution (block 551). If the memory write operation is pending, isolated system management unit 250 may de-assert an I/O ready line on the serial bus 210 (block 552). On the other hand, if the memory write operation is not pending, isolated system management unit 250 may maintain the I/O ready line in an asserted state (block 554). In this implementation, since there may be no feedback as to when a memory write has completed execution, isolated system management unit 250 may need to delay execution of additional memory write operations if the previous memory write operation is still pending. The I/O ready line on the serial bus 210 may be a handshaking mechanism by which isolated system management unit 250 notifies host system management unit 220 that a memory write is pending. In one embodiment, if host system management unit 220 detects a de-asserted I/O ready line, the bus may enter an idle state until the I/O read line is once again asserted (i.e., there are no pending memory write transactions). It is noted that the I/O ready line may be an out-of-band signal. It should be noted, however, that in various embodiments the I/O ready indicator may be implemented in-band. It is further noted that in still other embodiments isolated system management unit 250 may include a mechanism for performing multiple memory write operations at the same time.

It is noted, however, that in other embodiments the isolated DAQ device 102 described above may process memory I/O transactions by other methods, e.g., the memory read or write packets may include additional information and/or the memory write operations may be monitored by other mechanisms.

Figure 6A:
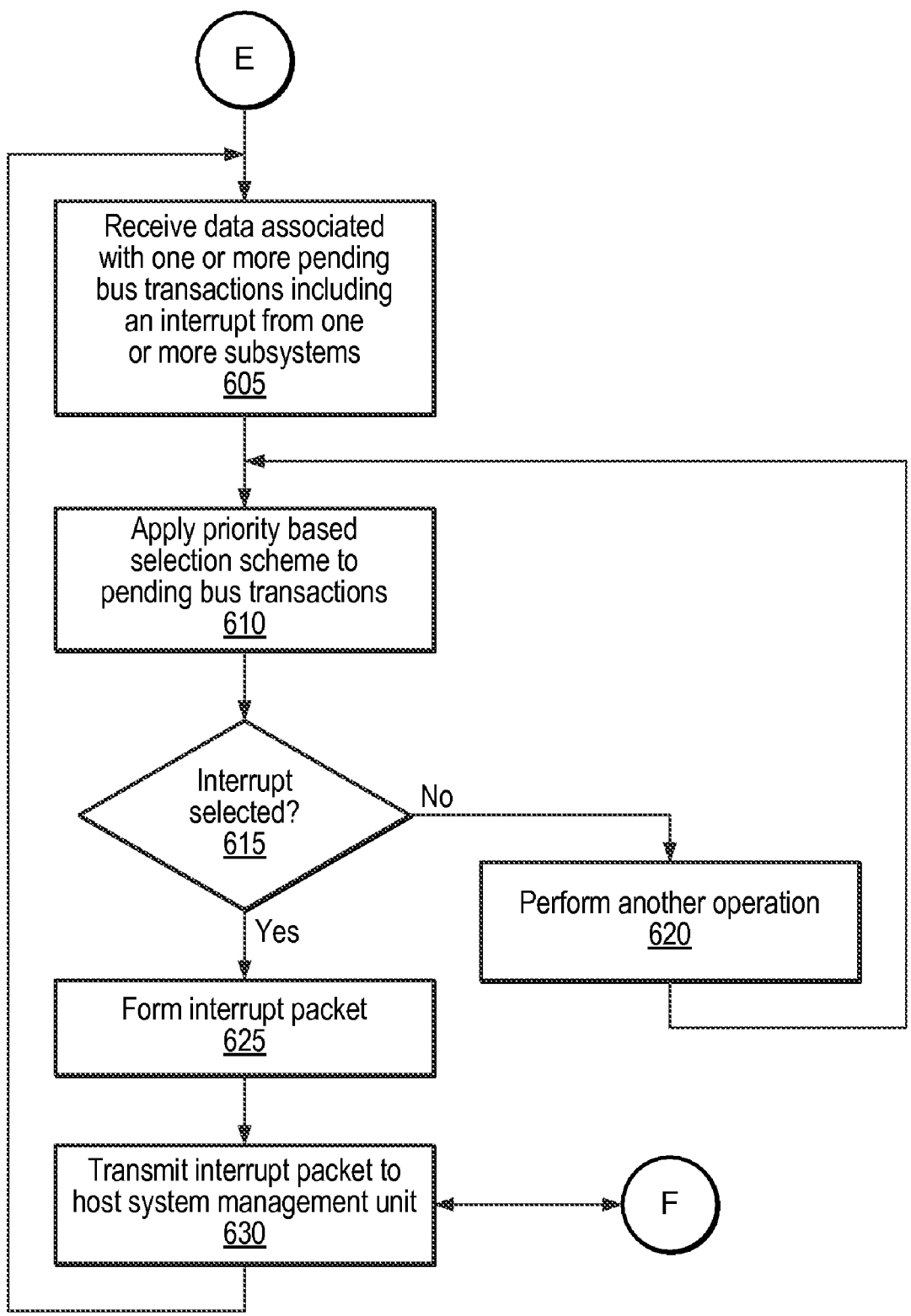
FIG. 6A is a flow diagram illustrating a method for selecting and performing an interrupt transaction using the isolated system management unit of the isolated DAQ device, according to one embodiment.
Figure 6B:
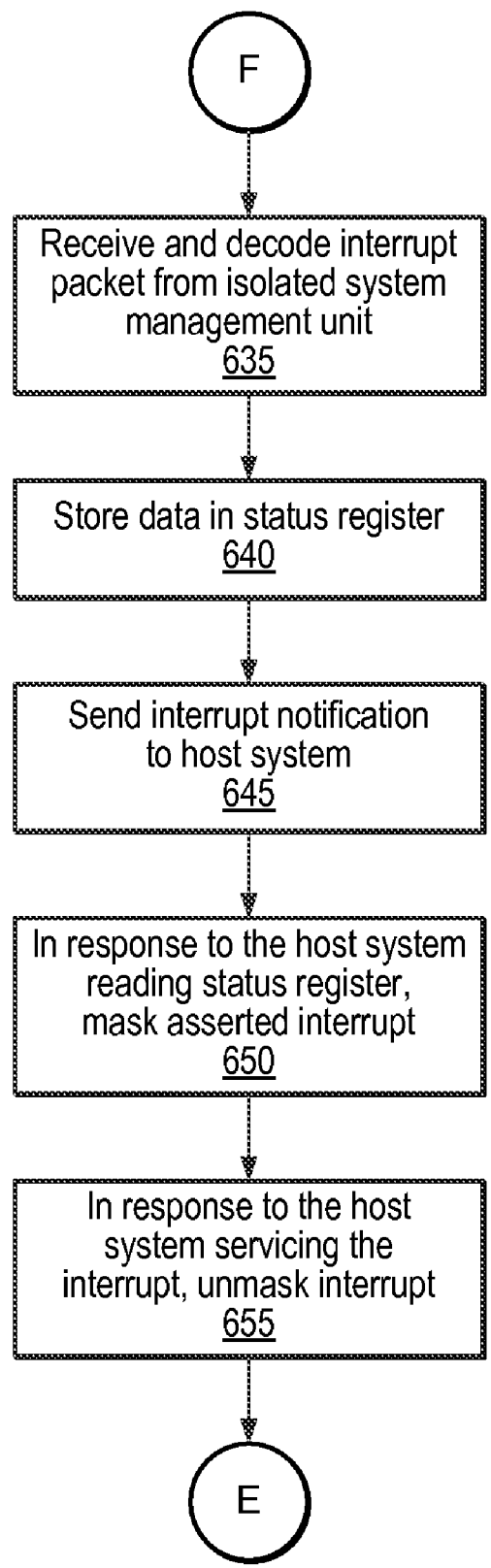
FIG. 6B is a flow diagram illustrating a method for selecting and performing an interrupt transaction using the host system management unit of the isolated DAQ device, according to one embodiment.

FIGS. 6A and 6B are flow diagrams illustrating a method for selecting and performing an interrupt transaction in the isolated DAQ device 102, according to one embodiment. It should be noted that in various embodiments, some of the steps shown may be performed concurrently, in a different order than shown, or omitted. Additional steps may also be performed as desired.

In an interrupt transaction, isolated system management unit 250 may send an interrupt packet to host system management unit 220. The interrupt packet may be used to notify host system management unit 220 that an event occurred in the isolated section of DAQ device 102 (or in a device connected to the subsystems in the isolated section). In one specific implementation, the interrupt packet may include two headers (H0 and H1) and interrupt status information. The first header H0 may specify the type of transaction (e.g., interrupt), and the second header H1 may specify a group of devices or a subsystem(s) associated with the interrupt. For instance, the second header may specify the AI subsystem 282 (including devices connected to the AI subsystem 282). The interrupt status information may be a plurality of bits (e.g., 16 bits) that provide a status for all the possible interrupts in the relevant group of devices/subsystem(s).

Referring collectively to FIGS. 2-3 and 6A-6B, during operation, isolated system management unit 250 may receive and store data associated with one or more pending bus transactions associated with one or more of the subsystems, e.g., data associated with interrupt transactions from AI subsystem 282 and/or DI subsystem 286 (block 605). In one embodiment, the data may be stored in FIFO buffer 365 shown in FIG. 3. Isolated system management unit 250 may also receive and store data associated with various other types of bus transactions, e.g., data stream requests or memory I/O requests from host system management unit 220.

Isolated system management unit 250 may apply a priority based selection scheme to select at least one of the pending bus transactions for processing and/or for transmission to host system management unit 220 via serial bus 210 (block 610). The priority based selection scheme may be similar to the scheme described above with reference to FIG. 4A.

If isolated system management unit 250 selects the interrupt transaction (block 615), isolated system management unit 250 may form an interrupt packet based on the data associated with the selected bus transaction (block 625). If isolated system management unit 250 does not select the interrupt transaction (block 615), isolated system management unit 250 may begin performing another operation(s), e.g., a data stream request (block 620), before once again checking the priority of the pending transactions (block 610).

Isolated system management unit 250 may form the interrupt packet by encoding and serializing the data associated with the selected interrupt transaction. In one embodiment, bus arbitration unit 355 of isolated system management unit 250 may include an encoder and a serializer to perform these functions. In one specific implementation, the data may include interrupt type and status information, which may be encoded and used to form the interrupt packet having one or more headers and interrupt status bits, for example.

After forming the interrupt packet, isolated system management unit 250 may transmit the packet across the isolation barrier to host system management unit 220 via serial bus 210 for processing (block 630).

As illustrated in FIG. 6B, host system management unit 220 may receive and decode the interrupt packet (block 635). In one embodiment, host system management unit 220 may determine the group of devices/subsystem(s) associated with the interrupt. Host system management unit 220 may then store the data in a status register. In one specific implementation, host system management unit 220 may include a status register for each associated group. Host system management unit 220 may subsequently send an interrupt notification to host 101 via host bus 205, e.g., a corresponding IRQ line may be asserted (block 645). In response to receiving the interrupt notification, host 101 may read the status register(s) at the host system management unit 220 to determine the status of the interrupts. After the host 101 reads the status register(s), the interrupts that are asserted may be masked to prevent generating new interrupts to host 101 (block 650). In the mean time, host 101 may service all the asserted interrupts. As each interrupt is serviced and acknowledged by host 101, the corresponding interrupts are de-asserted and unmasked (block 655).

It is noted, however, that in other embodiments the isolated DAQ device 102 described above may process interrupts by other methods, e.g., the interrupt information may be organized and stored by other mechanisms and/or the masking/unmasking process may be performed differently.

Figure 7:
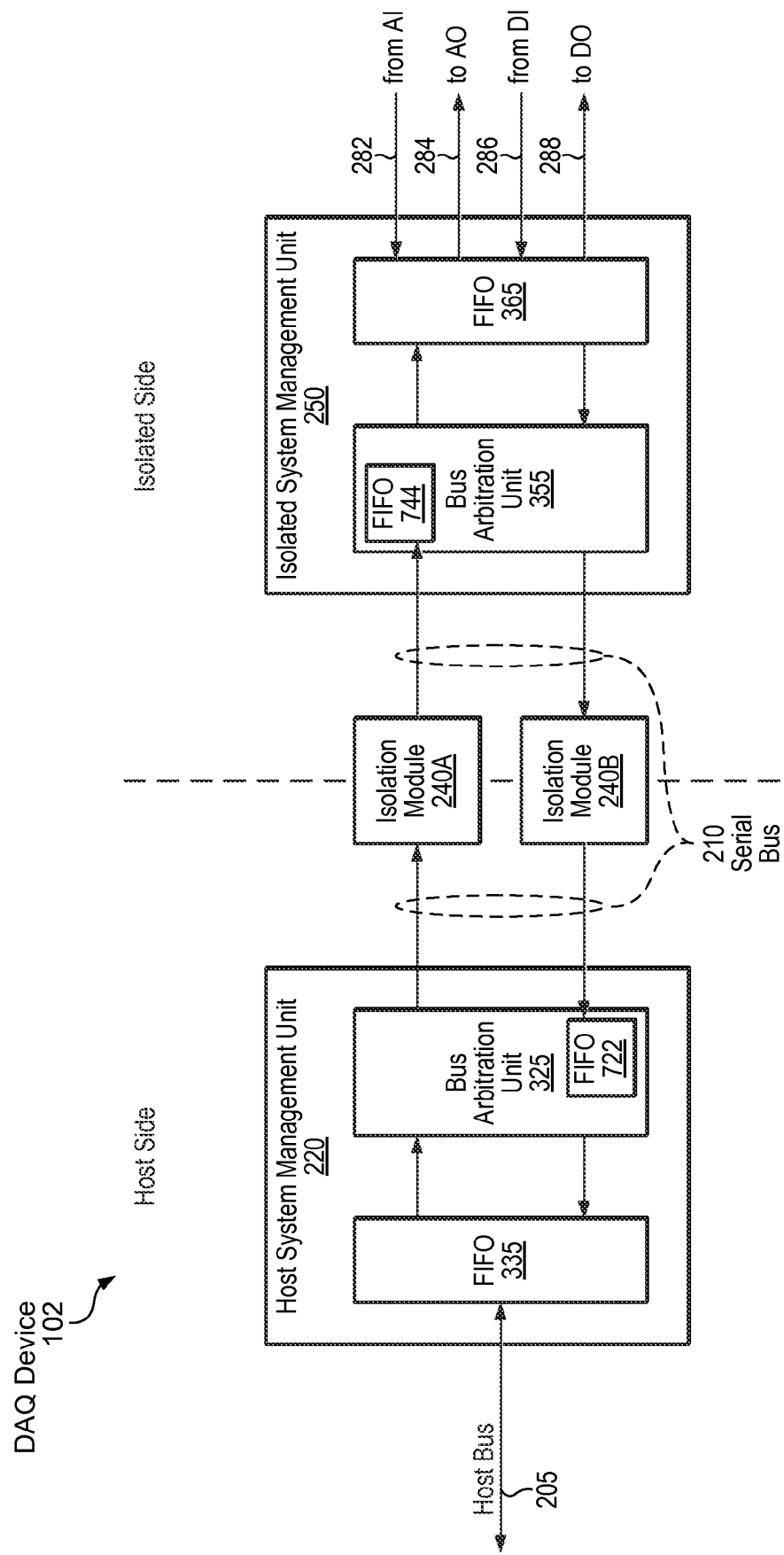
FIG. 7 is a block diagram of another embodiment of the host system management unit and isolated system management unit.

In various other embodiments, as illustrated in FIG. 7, host system management unit 220 may include FIFO buffer 722, and isolated system management unit 250 may include FIFO buffer 744, in addition to the components described above with reference to FIGS. 1-6B. In one specific implementation, FIFO buffers 722 and 744 may be included within bus arbitration unit 325 and 355, respectively, and connected to serial bus 210. It is noted, however, that in other implementations FIFO buffers 722 and 744 may be connected to serial bus 210 but may be physically located outside of the bus arbitration circuitry. FIFO buffers 722 and 744 may be connected to serial bus 210 and may temporarily store data associated with pending bus transactions until the data is processed by bus arbitration unit 325 or 355 and/or the data is provided to FIFO buffers 335 or 365. For example, FIFO buffer 722 may temporarily store stream data sent from isolated system management unit 250 to satisfy a data stream request, and may also temporarily store tokens sent from isolated system management unit 250 to host system management unit 220.

As described above, system management units 220 and 250 may implement a token based data control mechanism to control the amount of stream data that is provided from one system management unit to another during data stream transactions. In various embodiments, system management units 220 and 250 may also use the token based data control mechanism for other types of bus transactions. In these various embodiments, e.g., the embodiment show in FIG. 7, system management units 220 and 250 may determine the number of tokens to provide to the other system management unit for specific bus transactions based on the space available in the corresponding FIFO buffer 722 or 744. Specifically, host system management unit 220 may determine the token count to provide to isolated system management unit 250 for specific bus transactions based on the space available in FIFO buffer 722. Similarly, isolated system management unit 250 may determine the token count to provide to host system management unit 220 for specific bus transactions based on the space available in FIFO buffer 744.

FIFO buffers 722 and 744 may be shared among the various types of bus transactions. In other words, FIFO buffers 722 and 744 may store data associated with the various types of bus transactions, e.g., data stream transactions, memory I/O transactions, and interrupt transactions.

After system management unit 220 or 250 detects one or more pending bus transaction, system management unit 220 or 250 may assign tokens for at least one of the pending bus transactions based on a priority based scheme, e.g., the priority based scheme described above with reference to FIG. 4A, and based on the space available in the corresponding FIFO buffer 722 or 744. The space available in the FIFO buffer 722 or 744 may determine the number of available tokens to provide to the other system management unit. The priority based scheme may determine which of the pending bus transactions have a higher priority then the rest of the transactions, and therefore which of the pending bus transactions will be assigned tokens first. For example, if the system management unit detects a memory I/O transaction and a data stream request transaction, in one implementation, the memory I/O transaction may have a higher priority than the data stream request transaction. Since the memory I/O transaction has a higher priority than the data stream request, the system management unit may assign enough of the available tokens to perform the memory I/O transaction. Furthermore, if additional tokens are available, the system management unit may assign at least some tokens for the data stream request.

As described above, in one specific implementation, the system management unit may assign tokens to bus transactions by including a token count in the packet (e.g., memory I/O packet) provided to the other system management unit. During operation, if additional space is deallocated in the FIFO buffer 722 or 744, the system management unit may assign additional tokens to pending bus transactions. For instance, in the above example, if a third bus transaction was pending which had the lowest priority, the third bus transaction may not be assigned tokens initially. However, if additional space is deallocated in the corresponding FIFO buffer 722 or 744, the system management unit may then assign additional tokens to the pending bus transactions, according to the priority based scheme.

After providing the one or more packets, including the token count, to the other system management unit, the one or more bus transactions are executed. When each of the bus transactions is executed, the data associated with the executed bus transaction is sent across the isolation circuitry 240 and are stored in the corresponding buffer 722 or 744. The system management unit may then send this data to the corresponding FIFO buffer 335 or 365 for storage until the data is sent to the final destination. For example, if the bus transaction was a memory read or a data request, host system management unit 220 may send the data to the host via the host bus 205.

It should be noted that the components described with reference to FIG. 7 are meant to be exemplary only, and are not intended to limit the invention to any specific set of components or configurations. For example, in various embodiments, one or more of the components described may be omitted, combined, modified, or additional components included, as desired. For instance, in one embodiment, the system management units 220 and 250 may include other types of memory devices instead of or in addition to the FIFO buffers 335, 365, 722, and 744.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data acquisition device comprising:
a plurality of data acquisition channels;
an isolated system management unit coupled to the data acquisition channels;
a host system management unit coupled to a host communication channel;
a serial bus coupled to the host system management unit and the isolated system management unit;
isolation circuitry coupled to the serial bus, wherein the isolation circuitry is configured to electrically isolate the host system management unit from the isolated system management unit and the data acquisition channels;
wherein the isolated system management unit and the host system management unit are each configured to store data associated with one or more pending bus transactions, wherein each of the system management units is further configured to select at least one of the pending bus transactions according to a predetermined priority based scheme, encode and serialize the data associated with the selected pending bus transaction, and transmit the serialized data across the isolation circuitry to the other system management unit via the serial bus;
wherein the host system management unit is further configured to:
implement a token based data control mechanism to control an amount of data that is streamed from the isolated system management unit;
form a data request packet including a token count and stream identification information; and
transmit the data request packet to the isolated system management unit via the serial bus.

2. The data acquisition device of claim 1, further comprising a plurality of subsystems coupled to the data acquisition channels and configured to process data provided to the data acquisition device, wherein the isolated system management unit and the host system management unit are each configured to store data associated with one or more pending bus transactions involving one or more of the subsystems.

3. The data acquisition device of claim 2, wherein the plurality of subsystems include one or more analog input subsystems, analog output subsystems, digital input subsystems, and digital output subsystems.

4. The data acquisition device of claim 1, wherein the host system management unit is configured to arbitrate between pending data streaming transactions and memory I/O transactions, and wherein the isolated system management unit is configured to arbitrate between pending data streaming transactions, interrupt transactions, and memory read transactions.

5. The data acquisition device of claim 1, wherein the host system management unit is configured to receive data associated with a data request via the host communication channel, wherein, in response to the host system management unit selecting the data request according to a priority based scheme, the host system management unit is configured to encode and serialize the data associated with the data request to form a data request packet and transmit the data request packet to the isolated system management unit via the serial bus.

6. The data acquisition device of claim 1, wherein, in response to receiving the data request packet, the isolated system management unit is configured to acquire data via one or more of the data acquisition channels, wherein the isolated system management unit is configured to stream an amount of acquired data corresponding to the token count specified in the data request packet.

7. The data acquisition device of claim 1, wherein the isolated system management unit is configured to implement a token based data control mechanism to control the amount of data that is streamed from the host system management unit, wherein said the isolated system management unit is configured to form a data request packet including a token count and stream identification information, and transmit the data request packet to the host system management unit via the serial bus.

8. The data acquisition device of claim 1, wherein the host system management unit is configured to receive data associated with a memory I/O transaction via the host communication channel, wherein, in response to the host system management unit selecting the memory I/O transaction according to a priority based scheme, the host system management unit is configured to encode and serialize the data associated with the memory I/O transaction to form a memory I/O packet and transmit the memory I/O packet to the isolated system management unit via the serial bus.

9. The data acquisition device of claim 8, wherein, in response to receiving the memory I/O packet, the isolated system management unit is configured to decode the memory I/O packet to determine whether to perform a memory read or memory write transaction.

10. The data acquisition device of claim 9, wherein, in response to determining that the memory I/O packet is associated with a memory write transaction, the isolated system management unit is configured to determine at least one memory write transaction is pending, wherein if at least one memory write transaction is pending, the isolated system management unit is configured to de-assert an I/O ready line to delay execution of additional memory write operations.

11. The data acquisition device of claim 1, wherein the isolated system management unit is configured to receive data associated with an interrupt transaction via one or more of the data acquisition channels, wherein, in response to the isolated system management unit selecting the interrupt transaction according to a priority based scheme, the isolated system management unit is configured to encode and serialize the data associated with the interrupt transaction to form an interrupt packet and transmit the interrupt packet to the host system management unit via the serial bus.

12. The data acquisition device of claim 1, wherein the host system management unit and the isolated system management unit each include a buffer for storing data associated with one or more pending bus transactions, and a bus arbitration unit for selecting, encoding, and serializing the stored data for transmission over the serial bus.

13. The data acquisition device of claim 1, wherein the serial bus includes a plurality of transmission lines, wherein the isolation circuitry includes a corresponding plurality of isolation devices, wherein each of the isolation devices is coupled to a corresponding one of the transmission lines to isolate the host system management unit from the isolated system management unit and the data acquisition channels.

14. The data acquisition device of claim 1, wherein the host system management unit and the isolated system management unit each include a buffer, coupled to the serial bus, for storing data associated with one or more pending bus transactions, wherein the isolated system management unit and the host system management unit are each configured to determine the number of available tokens to assign to the at least one selected bus transaction based on the space available in the buffer.

15. The data acquisition device of claim 1, wherein the isolated system management unit and the host system management unit are each configured to assign the available tokens based on the priority based scheme, wherein at least a portion of the available tokens are first assigned to the highest priority bus transaction, wherein if the corresponding system management unit has available tokens after assigning tokens to the highest priority bus transaction, at least a portion of the available tokens are assigned to the next highest priority bus transaction.

16. A method for processing data in an isolated data acquisition device, the method comprising:
providing a plurality of data acquisition channels;
providing an isolated system management unit coupled to the data acquisition channels;
providing a host system management unit coupled to a host communication channel;
providing a serial bus coupled to the host system management unit and the isolated system management unit;
providing isolation circuitry coupled to the serial bus to electrically isolate the host system management unit from the isolated system management unit and the data acquisition channels;
storing data associated with one or more pending bus transactions in the host system management unit or the isolated system management unit;
selecting at least one of the pending bus transactions using one of the system management units and according to a predetermined priority based scheme, encoding and serializing the data associated with the selected bus transaction, and transmitting the serialized data across the isolation circuitry to the other system management unit via the serial bus;
implementing a token based data control mechanism to control an amount of data that is streamed from the isolated system management unit;
wherein said encoding the data comprises forming a data request packet including a token count and stream identification information; and
wherein said transmitting the serialized data comprises transmitting the data request packet to the isolated system management unit.

17. The method of claim 16, further comprising the host system management unit arbitrating between pending data streaming transactions and memory I/O transactions.

18. The method of claim 16, further comprising the isolated system management unit arbitrating between pending data streaming transactions, interrupt transactions, and memory read transactions.

19. An isolated data acquisition device comprising:
a plurality of data processing subsystems;
a plurality of data acquisition channels;
an isolated system management unit coupled to the plurality of data processing subsystems via the data acquisition channels;
a host system management unit coupled to a host communication channel, wherein the host communication channel is configured to couple to a host computer system;
a serial bus coupled to the host system management unit and the isolated system management unit;
isolation circuitry coupled to the serial bus, wherein the isolation circuitry is configured to electrically isolate the host system management unit from the isolated system management unit and the data processing subsystems;
wherein the isolated system management unit and the host system management unit are each configured to store data associated with one or more pending bus transactions between the system management units, wherein each of the system management units is configured to select at least one of the pending bus transactions according to a predetermined priority based scheme, encode and serialize the data associated with the selected bus transaction to form a data packet, and transmit the data packet across the isolation circuitry to the other system management unit via the serial bus;
wherein the host system management unit is further configured to:
implement a token based data control mechanism to control an amount of data that is streamed from the isolated system management unit;
form a data request packet including a token count and stream identification information; and
transmit the data request packet to the isolated system management unit via the serial bus.

20. The isolated data acquisition device of claim 19, wherein the serial bus includes a plurality of transmission lines, wherein the isolation circuitry includes a corresponding plurality of isolation devices, wherein each of the isolation devices is coupled to a corresponding one of the transmission lines to isolate the host system management unit from the isolated system management unit and the data processing subsystems.

* * * * *